United States Patent [19]

Sutherland, II et al.

[11] Patent Number: 4,689,668

[45] Date of Patent: Aug. 25, 1987

[54] AUXILIARY KINESCOPE BEAM CURRENT LIMITER WITH PLURAL CASCADED LOW PASS FILTER AND PEAK DETECTOR STAGES

[75] Inventors: Hugh F. Sutherland, II; Gary T. Osborne, both of Indianapolis, Ind.

[73] Assignee: RCA Corporation, Princeton, N.J.

[21] Appl. No.: 885,163

[22] Filed: Jul. 14, 1986

[51] Int. Cl.$^4$ .......................... H04N 9/20; H04N 5/68
[52] U.S. Cl. ...................................... 358/74; 358/243
[58] Field of Search ............................ 358/65, 74, 243

[56] References Cited

U.S. PATENT DOCUMENTS

| | | | |
|---|---|---|---|
| 4,017,681 | 4/1977 | Smeulers et al. | 358/243 |
| 4,096,517 | 6/1978 | Hinn | 358/40 |
| 4,167,025 | 9/1979 | Willis | 358/243 |
| 4,209,808 | 6/1980 | Harwood | 358/74 |
| 4,253,110 | 2/1981 | Harwood et al. | 358/74 |
| 4,451,849 | 5/1984 | Fuhrer | 358/161 |
| 4,549,217 | 10/1985 | Sendelweck | 358/243 |
| 4,562,479 | 12/1985 | McDonald | 358/243 |
| 4,599,643 | 7/1986 | Harlan | 358/74 |

*Primary Examiner*—James J. Groody
*Assistant Examiner*—Randall S. Svihla
*Attorney, Agent, or Firm*—Paul J. Rasmussen; Peter M. Emanuel; Ronald H. Kurdyla

[57] ABSTRACT

An auxiliary kinescope beam current limiter in a television receiver includes a control circuit responsive to a sensed signal representative of the combined instantaneous magnitudes of plural color video signals. The control circuit includes, in the order named, a first low pass filter, a first peak detector, a second low pass filter, and a second peak detector which provides a control signal to video signal processing circuits for limiting the amplitudes of the plural color video signals when a given amplitude threshold value is sensed as having been exceeded. The auxiliary beam current limiter is able to prevent warping or blistering of a shadow mask in a color kinescope due to scenes having a high beam current in, for example, an area equal to or greater than five to ten percent of the display screen area of the kinescope in both the horizontal and vertical directions.

7 Claims, 1 Drawing Figure

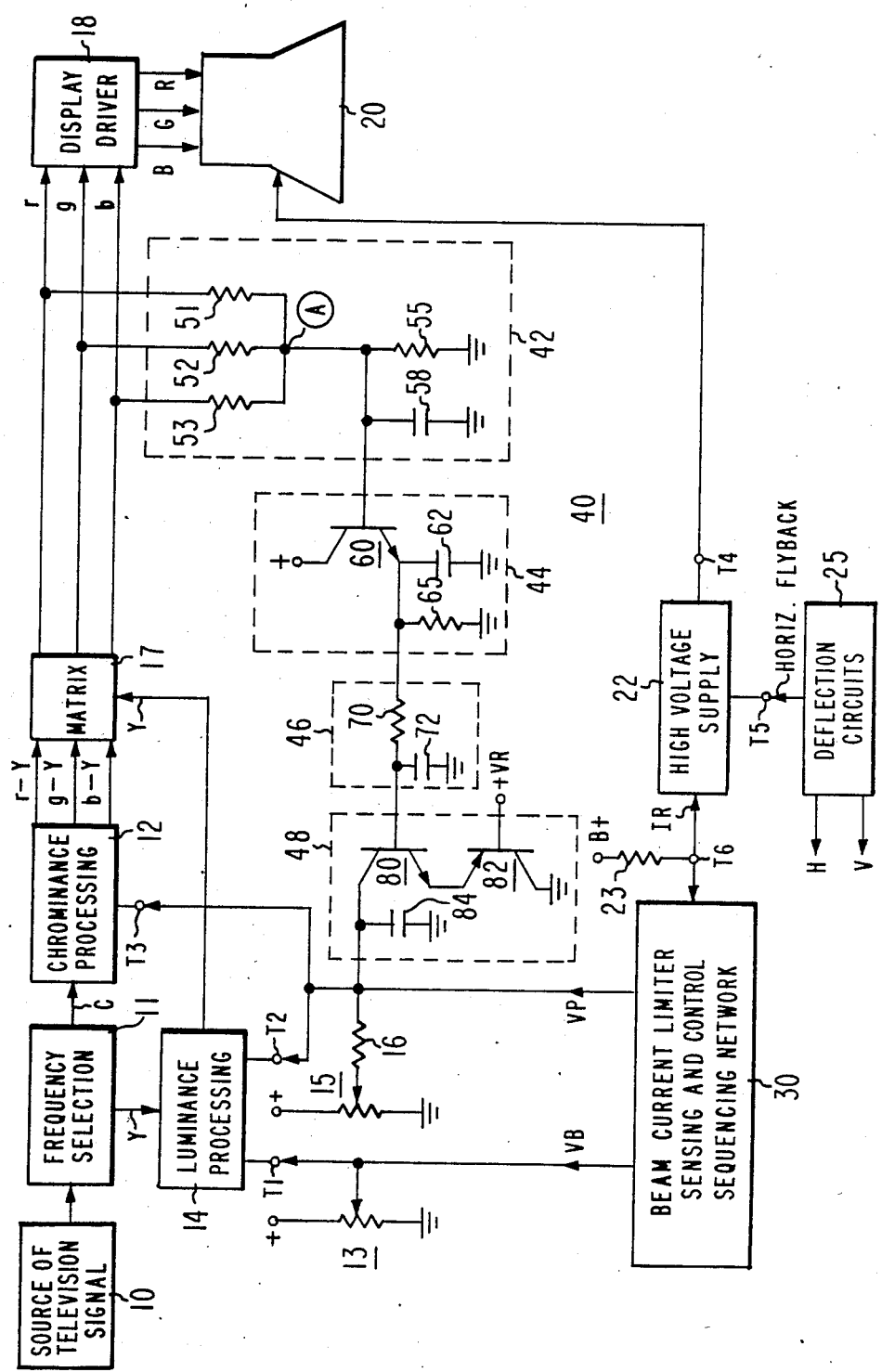

AUXILIARY KINESCOPE BEAM CURRENT LIMITER WITH PLURAL CASCADED LOW PASS FILTER AND PEAK DETECTOR STAGES

This invention concerns apparatus for automatically limiting excessive beam currents conducted by an image display device such as a kinescope in a television receiver or equivalent video signal processing and display system.

Excessive beam currents conducted by an image reproducing kinescope in a television receiver can result in a degraded image display. Specifically, excess beam currents can degrade the performance of the receiver deflection system which is operatively associated with the kinescope, and can cause electron beam spot defocussing and picture blooming. High beam currents can also exceed the safe operating current capability of the kinescope, possibly damaging the kinescope and associated circuit components which may be sensitive to high beam current levels.

Various arrangements for automatically controlling both excessive average and peak beam currents are known. One such arrangement is described in U.S. Pat. No. 4,167,025—Willis. In that arrangement, as well as in other known automatic beam current limiter arrangements, a signal representative of the magnitude of the kinescope beam current is derived from the kinescope high voltage resupply system of the receiver. The beam current limiter responds to such signal when it exceeds a threshold level indicating the presence of excessively high kinescope beam current levels as manifested by the kinescope resupply current.

Beam current limiters of the type which operate in conjunction with the kinescope resupply system, as mentioned above, do not respond instantaneously to an excessive beam current condition due to delays inherent in the kinescope resupply system. For example, the kinescope anode capacitance can be discharged greatly in response to video signals representative of very bright or peak white scenes. The kinescope capacitance is eventually recharged via the high voltage resupply system, but with a delay associated with the value of the kinescope capacitance and the effective charging impedance of the resupply system, among other factors. In recognition of this fact, U.S. Pat. No. 4,599,643 of Wayne E. Harlan describes a system wherein excessive kinescope beam currents are limited by means of apparatus which operates independent of the kinescope resupply system. In the Harlan system, a combined signal representative of the combined instantaneous magnitudes of plural color video signals is provided. The combined signal is afterwards compared to a fixed threshold level and, if exceeding the threshold level, the compared combined signal is detected. The detected signal is used to limit the magnitude of color signals applied to the display device.

It is herein recognized as desirable to limit excessive kinescope beam currents of the type which are particularly likely to cause warping or blistering of the shadow mask in a kinescope such as a color kinescope in a color television receiver. It has been observed that such warping or blistering can be caused by scenes having a high beam current in, for example, an area equal to or greater than five to ten percent of the display screen area in both the horizontal and vertical dimensions. Accordingly, there is disclosed herein beam current limiter apparatus for achieving this result in accordance with the principles of the present invention.

In a disclosed preferred embodiment of the invention, a combined signal, representative of the combined instantaneous magnitudes of plural color image signals intended to be applied to an image display device, is applied to a control circuit. The control circuit includes, in the order named, a first low pass filter, a first peak detector, a second low pass filter, and a second peak detector which provides a control signal to video signal processing circuits for limiting the amplitude of the video signal when a given amplitude threshold value is sensed as having been exceeded.

In accordance with a feature of the invention, the second low pass filter exhibits a time constant which is substantially greater than the time constant of the first low pass filter. Also, the second peak detector exhibits a time constant which is substantially greater than the time constant of the first peak detector.

The single FIGURE of the drawing shows a portion of a color television receiver, partly in block form and partly in schematic circuit form, including apparatus in accordance with the principles of the present invention.

A composite color television signal from a source 10 is applied to a frequency selection network 11 which provides separated luminance (y) and chrominance (c) components of the television signal at respective outputs. A chrominance processor 12 derives plural color difference signals r-y, g-y and b-y from the separated chrominance component. The separated luminance component is processed by a luminance processor 14 which includes DC level shifting, amplifying and gain control circuits, for example. The wiper of a manual, viewer adjustable brightness control potentiometer 13 is coupled via a terminal $T_1$ to a luminance signal DC level control input of processor 14. The DC level of the luminance signal and the brightness of a displayed image vary in accordance with the level of the voltage applied to terminal $T_1$. The wiper of a manual, viewer adjustable picture control 15 is coupled through a resistor 16 and via a terminal $T_2$ to a luminance signal gain control input of processor 14, and via a terminal $T_3$ to a chrominance signal gain control input of chrominance processor 12. The gains of the luminance and chrominance signals and thereby the contrast of a displayed image vary in accordance with the level of the voltage applied to terminals $T_2$ and $T_3$.

A processed luminance signal from processor 14 is combined with the color difference signals from processor 12 in a matrix amplifier 17 for producing low level color image representative signals r, g and b. These signals are applied to respective kinescope driver amplifiers in a display driver stage 18 for producing high level video output signals R, G, B suitable for driving the intensity control electrodes, e.g., cathode electrodes, of a color image displaying kinescope 20. The driver amplifiers in stage 18 illustratively comprise feedback cascode driver amplifier of the type shown, for example, in U.S. Pat. No. 4,096,517.

A high operating voltage for the ultor (anode) electrode of kinescope 20 is provided from an output terminal $T_4$ of a high voltage supply network 22 which includes a high voltage multiplier. Horizontal flyback pulses from receiver deflection circuits 25 are applied to network 22 via a terminal $T_5$, and kinescope resupply current IR from a current source including a resistor 23 and a source of potential B+ is provided to network 22 via a terminal $T_6$.

Operatively associated with the kinescope resupply current source is an automatic kinescope beam current limiter sensing and control sequencing network 30. Beam current limiter network 30 responds to the magnitude of the resupply current, which is representative of the magnitude of the beam current conducted by the kinescope, for automatically limiting both excessive peak and average kinescope beam currents. Additional details of beam current limiter network 30 are found in U.S. Pat. No. 4,599,643—Harlan mentioned previously. Briefly, a variable control voltage $V_P$ is developed when excessive beam currents occur throughout a first range, in which case voltage $V_P$ serves to limit such excessive beam currents by reducing the amplitudes of the luminance and chrominance signals via gain control inputs $T_2$ and $T_3$ of luminance processor 14 and chrominance processor 12. Control voltage $V_B$ is developed in response to excessive beam currents throughout a second range having a magnitude greater than the magnitude of beam currents within the first range. In such case the picture gain control beam current limiting action is supplemented by reducing the DC level of the video signal (i.e., reducing image brigthness) via control voltage $V_B$ and terminal $T_1$ of luminance processor 14. A sequentially operating beam current limiter of this type is described in U.S. Pat. No. 4,253,110 of L. A. Harwood et al., and is also discussed in U.S. Pat. No. 4,451,849 of J. S. Fuhrer.

Additional automatic beam current limiting is provided by means of an auxiliary beam current limiter network comprising a control network 40 in accordance with the principles of the present invention.

Network 40 includes a signal combining and first low pass filtering circuit 42, a first peak detector 44, a second low pass filter 46, and a threshold second peak detector circuit 48.

The instantaneous peak magnitudes of color signals r, g and b are respectively sensed by means of resistors 51, 52 and 53 which are separately connected to low impedance (e.g., emitter follower) outputs of matrix 17. A combined signal representative of the sum of the instantaneous magnitudes of the r, g and b signals is developed at a summing node A. Resistors 51, 52 and 53 together with a resistor 55 and a capacitor 58 form a first low pass filter with a time constant of approximately 0.05H where H is the time of one horizontal image scanning line. This low pass filter reduces the sensitivity of control circuit 40 to narrow video signal peaks such as are associated with narrow vertical image lines (e.g., in a cross-hatch pattern), for which large beam current drive is often desirable. However, if a sensed peak representative video signal has a duration of approximately 5% of a horizontal line interval or greater, a related voltage will be developed across filter capacitor 58 and will be peak detected by first peak detector 44.

First peak detector 44 includes a transistor 60 and a filter capacitor 62 in the emitter circuit of transistor 60. Capacitor 62 discharges via a resistor 65. Detector 44 preferably exhibits a discharge time constant of approximately five horizontal line intervals, and acts to preserve vertical video image information in the output signal from the low pass filter section of circuit 42. In the case of a full vertical bar pattern having a width of about 10% of the screen width for example, the voltage across capacitor 58 relating to such pattern would tend to discharge excessively during portions of horizontal line intervals when the vertical pattern information is absent. Detector 44 peak detects the voltage on capacitor 58 to assure that the integrity of information such as that of the described vertical pattern is preserved.

Second low pass filter 46, formed by a resistor 70 and a capacitor 72, responds to the peak detected output signal from detector 44 and renders the control circuit less sensitive to very short sensed signal peaks which last only one or two horizontal line intervals. Filter 46 exhibits a time constant of approximately five horizontal line intervals and develops a voltage across filter capacitor 72 which includes relatively longer duration horizontal information as well as vertical information.

Second peak detector 48 comprises a normally nonconductive transistor 80 which responds to the filtered signal from filter 46, a filter capacitor 84 coupled to the collector output of transistor 80, and a transistor 82 arranged as shown in the emitter circuit of transistor 80. A threshold operating condition of transistor 80 is determined by the value of a reference voltage VR applied to the base of transistor 82. Circuit 48 exhibits a discharge time constant on the order of five vertical field intervals and allows the control circuit to respond to a peak sensed signal condition within approximately ten horizontal line intervals, which assists to prevent excessive loading of sensitive power supplies of the system, e.g., as may be associated with supply 22. The relatively long time constant of circuit 48 prevents vertical rate shading of a displayed image due to changes in image contrast from the beginning to the end of a vertical field.

When the input voltage of detector 48 at the base of transistor 80 exceeds a predetermined threshold value, normally nonconductive transistor 80 is rendered conductive, causing the signal gain of processors 12 and 14, and the contrast of a displayed image, to be reduced in accordance with the level of conduction of transistor 80. Accordingly, the video signal drive to the kinescope will be reduced a related amount until an equilibrium point is reached when the input voltage of transistor 80 is just at or slightly below the threshold operating voltage of transistor 80.

Transistor 82 acts as a low impedance voltage source through which capacitor 84 can be discharged when the voltage at the base of transistor 80 rises to a level approximately two base-emitter junction offset voltage drops above the value of voltage VR. The value of capacitor 84 is chosen to be large enough with regard to elements 15 and 16 of the picture (contrast) control circuits so that the desired time constant for circuit 48 is produced. Capacitor 84 also serves to filter the control voltage developed at the wiper of potentiometer 15, e.g., for filtering noise and locally generated interference components. The voltage across capacitor 84 is modified in accordance with the level of conduction of transistor 80 so that a resulting voltage applied to the gain control inputs of video signal processors 12 and 14 reduces the magnitudes of the color signals which are ultimately applied to the kinescope, thereby reducing kinescope beam current by closed loop feedback action.

The effect of control circuit 40 advantageously supplements the operation of beam current limiter network 30, which exhibits both peak and average beam limiting modes of operation in response to the magnitude of resupply current IR as discussed in aforementioned U.S. Pat. No. 4,599,643. Specifically, control circuit 40 is capable of limiting excessive beam current of a type which could otherwise cause warping or blistering of the kinescope shadow mask. As noted previously, such warping can be caused by scenes having a high beam current in five to ten percent, or greater, of the display screen area in each of the horizontal and vertical dimensions.

Control circuit 40 is preferably DC coupled to the video signal path, e.g., between the output of matrix network 17 and the gain control inputs of luminance processor 14 and chrominance processor 12, and controls the video signal amplitude substantially without affecting the video signal DC level to avoid transient image brightness changes as the video signal peak-to-peak amplitude is controlled. Control circuit 40 also is preferably coupled to a low level video signal path, rather than to a high level video signal path such as between the outputs of driver 18 and the kinescope cathode electrodes.

What is claimed is:

1. In a system for processing and displaying color video signal image information, apparatus comprising:
   a source of plural color video signals;
   a color image display device;
   means for conveying said plural color video signals from said signal source to signal input electrodes of said display device;
   combining means coupled to said conveying means for providing a combined signal representative of the sum of the instantaneous magnitudes of said plural color video signals conveyed by said conveying means;
   first filter means responsive to said combined signal for providing a first filtered signal;
   first detector means responsive to said first filtered signal for providing a first detected signal;
   second filter means responsive to said second detected signal for providing a second filtered signal;
   second detector means responsive to said second filtered signal for providing an output control signal when said second filtered signal exhibits a magnitude exceeding a threshold value; and
   means for coupling said control signal to said signal source for limiting the magnitudes of said plural color video signals from said signal source in accordance with the magnitude of said control signal.

2. Apparatus according to claim 1, wherein
   said second filter means exhibits a time constant greater than a time constant of said first filter means; and
   said second detector means exhibits a time constant greater than a time constant of said first detector means.

3. Apparatus according to claim 1, wherein
   said first and second detector means are peak detectors; and
   said first and second filter means are low pass filters.

4. Apparatus according to claim 3, wherein
   said second low pass filter exhibits a time constant of several horizontal video line intervals in duration; and
   said second peak detector exhibits a time constant of several vertical video field intervals in duration.

5. Apparatus according to claim 4, wherein
   said second low pass filter exhibits a time constant of at least an order of magnitude greater than a time constant of said first low pass filter; and
   said second peak detector exhibits a time constant of at least an order of magnitude greater than a time constant of said first peak detector.

6. Apparatus according to claim 1, wherein said conveying means comprises plural color signal paths associated with respective outputs of said source of plural color video signals;
   a display driver stage for providing amplified color signals suitable for driving said signal input electrodes of said display device receives said plural color video signals via said plural signal paths; and
   said combining means comprises plural resistive means respectively coupled to said plural signal paths.

7. Apparatus according to claim 1, wherein
   said source of plural color video signals comprises a luminance signal processing channel and a chrominance signal processing channel;
   adjustable gain control means is coupled in common to said luminance and chrominance channels for varying the gain of both said luminance and chrominance channels, to thereby vary the contrast of an image displayed by said display device; and
   said control signal is coupled to said adjustable gain control means for limiting the image contrast representative peak amplitude of said plural color video signals conveyed to said signal input electrodes of said display device, substantially exclusive of limiting the image brightness representative DC level of said plural color video signals conveyed to said signal input electrodes of said display device.

* * * * *